Feb. 24, 1959
R. B. MILLS
2,874,589
PROTECTOR GUARD
Filed Feb. 15, 1957
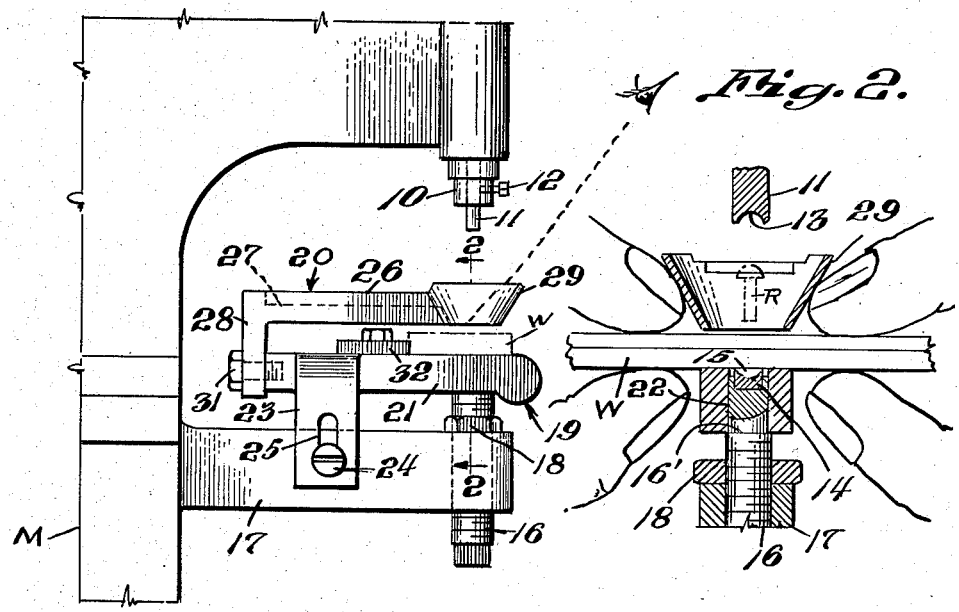
Fig. 1.
Fig. 2.
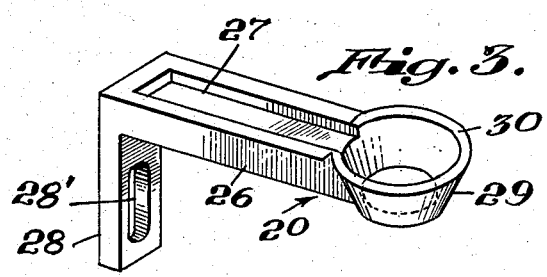
Fig. 3.
INVENTOR.
Ralph B. Mills
BY
Barlow & Barlow
ATTORNEYS.

United States Patent Office 2,874,589
Patented Feb. 24, 1959

2,874,589

PROTECTOR GUARD

Ralph B. Mills, Pawtucket, R. I., assignor to American Cord & Webbing Company, a corporation of New York Application February 15, 1957, Serial No. 640,411

1 Claim. (Cl. 74—608)

The present invention relates to a safety guard for a machine tool having a pair of dies between which the work is positioned to have a machine operation performed thereon.

In certain types of work assemblies requiring a machine operation, as by way of example a riveting operation, the work is manually advanced to the machine tools and manually held during the insertion and the upset of the rivet. In positioning the work between the machine tools, the operator holds the work between his or her hands close to the location at which the rivet is to be inserted so as to enable the operator to better gauge the proper positioning of the work in the machine. The nature of the labor involved in this type of assembling of work pieces becomes most monotonous and often leads to carelessness on the part of the operator who may unintentionally place his or her fingers in the path of the riveting tools which may result in injury to the operator.

I am aware that many protective devices may have been proposed adapted to prevent injury to operators of similar machines. Such devices of which I am familiar usually take the form of some moving element which sweeps across the path of the descending die so as to brush aside the operator's hands from the path of the descending tool or dies. In some instances where the guard is held stationary the construction is such as to block the view of the operator to the proper positioning of the work between the tools of the machine.

An object of the invention is to provide a guard which will be so constructed as to be adapted to be positioned on the machine in a manner to fence in the danger zone or area and thereby provide a barrier to block positioning of the operator's hand or fingers in the path of the tools of the machine, and which guard will not materially block the operator's vision so as to allow the proper positioning of the work in the machine.

Another object of the invention is to provide a guard free of any moving parts which will be simple in construction, economical to manufacture and durable to use.

With these and other objects in view, the invention consists of certain novel features of construction as will be more fully described and particularly pointed out in the appended claims.

In the accompanying drawings:

Fig. 1 is a side elevation of a machine having a reciprocating plunger and provided with a guard embodying the present invention;

Fig. 2 is an enlarged sectional view taken substantially along line 2—2 of Fig. 1; and Fig. 3 is a perspective view of the guard shown in Fig. 1.

The machine M illustrated in Fig. 1 is of a general type having a reciprocating plunger and a lower die block between which the work is positioned to have a machine operation performed thereon. In the present disclosure, the machine is modified to perform a riveting operation. Accordingly, the plunger or ram 10 is provided with a riveting tool or movable die 11 which is secured in position in a known manner, as by way of example, a clamp bolt 12. The work end of the die 11 may be provided with a depression or cavity 13 having the configuration of the heads of the rivet R, which is shown in broken lines and used for a riveting operation on the work indicated W. An anvil or lower die 14 has a cavity 15 (see Fig. 2) which is similar to the cavity 13 and in which is received the leading end of the rivet R to upset the same and form a head thereon of a desired contour. The die 14 is supported on the upper end of a stud 16 which extends through the forward end portion of a bracket 17 in screw threaded engagement therewith and is secured in adjusted position by a lock nut 18.

In performing a riveting operation, the work W is positioned to rest on die 14 and the rivet R is guided and held in line with the dies by means of mechanism not shown, but well known in the art and forming no part of the present invention. With the work W held between the hands of the operator as seen in Fig. 2, the machine is set into action in a known manner (not shown) which will cause the ram 10 to be lowered and the die 11 to engage and force the rivet R through the work, the leading end of the rivet engaging in the cavity 15 and being upset thereby into a head of a desired contour. It will be apparent the nearer the work is held to the location at which the rivet R is to be inserted that greater accuracy may be had for the operator to gauge the proper positioning of the work between the dies. As previously mentioned, the nature of this type of labor is continuous and becomes very monotous which leads to carelessness on the part of the operator which may result in the accidental positioning of the operator's hand within the path of the descending die 11 to result in serious injury.

In carrying out the object of the present invention, I provide a guard having a lower section 19 and an upper section 20. The lower section comprises an elongated body 21 having an opening 22 therethrough into which is inserted the upper end of the stud 16 so as to surround the die 14, the stud 16 being reduced so as to form a shoulder 16' against which the lower edge of the opening 22 rests. The body 21 extends rearwardly from the die 14 and has a mounting arm 23 which depends into engagement with the bracket 17 and is adjustably secured thereto by a clamp screw 24 which extends through a slot 25 in the arm 23.

The upper section 20, which may be made of one piece of suitable material such as metal, organic or a synthetic, comprises a body 26 (see Fig. 3) which is shown as being elongated and generally rectangular in cross section and having a recess 27 extending inwardly from the upper side thereof. A bracket arm 28 having a slot 28' depends from the body at one end portion thereof and the other end of the body is enlarged into a hollow inverted frustro-conical portion 29, the walls 30 of which are made reasonably thin. The inner and outer sides of said walls 30 extend substantially parallel to each other and the recess 27 opening into the hollow of portion 29.

The guard 25 is attached to the inner end of the body 21 as shown by means of a clamp bolt 31 extending through slot 28' and having screw threaded engagement with the body 21. As seen in Fig. 1 the upper section 20 is positioned above the lower section 19 a distance slightly greater than the thickness of the work W, and the portion 29 extends in line with the dies of the machine. It will be apparent the space between the sections 19, 20 may be chosen to provide for various thicknesses of work by reason of the slot 28'. A stop 32 may be provided against which the work may engage to assist locating the riveting operation on the work W.

Referring to Fig. 2, it will be seen the wall of the lower section 19 which surrounds the die 14 and the portion 29 provides a barrier for blocking the insertion of the fingers of the operator within what may be referred to as a danger zone or area. It will be particularly noted the slanted walls of portion 29 allow the operator to hold the work reasonably close to the location at which the rivet is to be inserted through the work. It will also be noted that the portion 29 provides a gauge to aid in properly positioning of the work on the die 14. Further, it will be seen that while the guard fences in the danger area, the portion 29 does not materially block the view of the operator so that he may look through the hollow of the guard portion 29 to correctly position the work centrally of the die 14.

From the above description, it will be apparent the guard is adapted to be attached to machines of the general character above described. The guard unit has been described in connection with a machine tool which is adapted to perform a rivet operation; it will, however, be apparent that the device is particularly adapted to such types of machines as, for example, a so-called well known press having a stationary die and a movable die which is attached to the ram of the machine and between which dies the work may be positioned to have a machine operation performed thereon. Thus, with the guard in position, the work may be correctly positioned on the stationary die without inserting the operator's hands within a confined working area of the dies.

I claim:

In a machine having a stationary die and a movable die mounted for reciprocation toward and from the stationary die and between which dies the work is positioned to have a machine operation performed thereon, a guard for said dies comprising a hollow open center tubular member having open top and bottom and a taper on both the inner and outer surfaces with respect to the axis of a said member and the taper on the inner surface being sufficiently upwardly and outwardly flaring to allow viewing of the work through the open center of the member from above the member and a manual grasping of the work below the member close to the action of the dies and means to engage the member intermediate its top and bottom to support the member without obstructing the viewing of the work through the member from a position clear of the stationary and movable dies of the machine.

References Cited in the file of this patent

UNITED STATES PATENTS

| | | |
|---|---|---|
| 1,447,987 | Johnson | Mar. 13, 1923 |

FOREIGN PATENTS

| | | |
|---|---|---|
| 560,705 | Great Britain | Apr. 17, 1944 |

OTHER REFERENCES

Publication, Machinery, page 418, September 22, 1949.